(12) United States Patent
Wojatzki et al.

(10) Patent No.: US 9,393,883 B2
(45) Date of Patent: *Jul. 19, 2016

(54) ADJUSTABLE SEAT TRACK HAVING TRACK ENGAGEMENT STRUCTURE

(75) Inventors: Michael Wojatzki, Ennigerloh (DE); Hans-Peter Mischer, Bad Meinberg (DE); Klaus Walter, Paderborn (DE); Marc Laumeier, Langenberg (DE); Andre Schebaum, Steinhagen (DE); Joerg Sternberg, Rheda-Wiedenbru (DE); Stefan Schumacher, Allershausen (DE); Michael Maddelein, Northville, MI (US)

(73) Assignee: Lear Corporation, Southfield, MI (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/219,989

(22) Filed: Aug. 29, 2011

(65) Prior Publication Data

US 2012/0074287 A1    Mar. 29, 2012

Related U.S. Application Data

(60) Provisional application No. 61/387,654, filed on Sep. 29, 2010.

(51) Int. Cl.
   *B60N 2/08* (2006.01)
(52) U.S. Cl.
   CPC ............ *B60N 2/0843* (2013.01); *B60N 2/0818* (2013.01); *B60N 2/0887* (2013.01)
(58) Field of Classification Search
   CPC .......... B60N 2/06; B60N 2/07; B60N 2/0705; B60N 2/0715; B60N 2/08; B60N 2/0812; B60N 2/0818; B60N 2/0837; B60N 2/0843; B60N 2/085; B60N 2/0881; B60N 2/0887
   USPC ......................... 248/424, 429, 420, 423, 430; 296/65.13, 65.14, 65.15; 297/344.1, 297/337
   See application file for complete search history.

(56) References Cited

U.S. PATENT DOCUMENTS 5,167,393 A    12/1992 Hayakawa et al.
5,772,173 A     6/1998 Couasnon
(Continued)

FOREIGN PATENT DOCUMENTS

CN    101585325 A    11/2009
DE     10039511 A1    2/2002
(Continued)

OTHER PUBLICATIONS

International Search Report to PCT/US2009/068697, dated Jun. 21, 2011, 13 pgs.

(Continued)

*Primary Examiner* — Jonathan Liu
*Assistant Examiner* — Guang H Guan
(74) *Attorney, Agent, or Firm* — MacMillan, Sobanski & Todd, LLC

(57) ABSTRACT

A seat adjustment apparatus includes a first rail and a second rail each having a plurality of openings that extend along a longitudinal axis, the openings being defined by spaced-apart locking surfaces. A locking mechanism having first and second locking portions is configured to engage the first and second rails. The first and second locking portions are selectively rotatable between a released position and a locked position. In the locked position, the first and second locking portions are configured for relative axial movement along the longitudinal axis such that the interaction of the locking mechanism with portions of the first and second rails attenuates longitudinal freeplay therebetween.

20 Claims, 11 Drawing Sheets

(56) References Cited

U.S. PATENT DOCUMENTS

| | | | |
|---|---|---|---|
| 5,806,825 A | 9/1998 | Couasnon | |
| 5,813,648 A | 9/1998 | Moradell et al. | |
| 5,918,847 A * | 7/1999 | Couasnon | 248/430 |
| 5,931,436 A | 8/1999 | Rohee | |
| 6,079,688 A | 6/2000 | Levillain et al. | |
| 6,113,051 A | 9/2000 | Moradell et al. | |
| 6,227,596 B1 | 5/2001 | Foucault et al. | |
| 6,322,035 B1 | 11/2001 | D'Amtimo et al. | |
| 6,322,036 B1 | 11/2001 | Tame et al. | |
| 6,349,914 B1 | 2/2002 | Yoshida et al. | |
| 6,354,553 B1 | 3/2002 | Lagerweij et al. | |
| 6,505,805 B2 | 1/2003 | Fuller | |
| 6,572,066 B1 | 6/2003 | Paisley et al. | |
| 6,637,712 B1 | 10/2003 | Lagerweij | |
| 6,641,104 B2 | 11/2003 | Flick | |
| 6,648,292 B2 | 11/2003 | Flick et al. | |
| 6,669,284 B2 | 12/2003 | Feichtinger et al. | |
| 6,688,574 B2 | 2/2004 | Okazaki et al. | |
| 6,843,532 B2 | 1/2005 | Borbe et al. | |
| 6,869,057 B2 | 3/2005 | Matsumoto et al. | |
| 6,902,235 B2 | 6/2005 | Rohee et al. | |
| 6,923,415 B2 | 8/2005 | Yokoi et al. | |
| 6,981,681 B2 | 1/2006 | Matsumoto | |
| 7,000,880 B2 * | 2/2006 | Jaudouin | 248/429 |
| 7,025,319 B2 | 4/2006 | Willems et al. | |
| 7,066,521 B2 | 6/2006 | Jung et al. | |
| 7,097,250 B2 | 8/2006 | Rausch et al. | |
| 7,147,195 B2 | 12/2006 | Danjo et al. | |
| 7,150,441 B2 | 12/2006 | Leguede et al. | |
| 7,293,752 B2 | 11/2007 | McCulloch et al. | |
| 7,328,877 B2 | 2/2008 | Yamada et al. | |
| 7,331,558 B2 | 2/2008 | Jeong | |
| 7,431,256 B2 | 10/2008 | Yamada et al. | |
| 7,523,913 B2 | 4/2009 | Mizuno et al. | |
| 7,780,138 B1 * | 8/2010 | Lee et al. | 248/429 |
| 8,136,784 B2 * | 3/2012 | Yamada et al. | 248/424 |
| 8,215,602 B2 * | 7/2012 | Walter et al. | 248/424 |
| 8,398,043 B2 * | 3/2013 | Kimura et al. | 248/424 |
| 8,517,328 B2 * | 8/2013 | Wieclawski | 248/429 |
| 8,573,698 B2 * | 11/2013 | Wojatzki | B60N 2/0705 248/420 |
| 2004/0026975 A1 | 2/2004 | Rausch et al. | |
| 2004/0188586 A1 * | 9/2004 | Jaudouin | B60N 2/08 248/429 |
| 2007/0090260 A1 | 4/2007 | Kojima | |
| 2007/0090263 A1 | 4/2007 | Yamada et al. | |
| 2007/0176072 A1 | 8/2007 | Ikegaya et al. | |
| 2008/0231101 A1 | 9/2008 | Sakakibara et al. | |
| 2009/0114793 A1 | 5/2009 | Brewer et al. | |
| 2009/0218843 A1 * | 9/2009 | Wojatzki et al. | 296/65.13 |
| 2009/0289485 A1 | 11/2009 | Walter et al. | |
| 2012/0074287 A1 * | 3/2012 | Wojatzki | B60N 2/0818 248/429 |
| 2013/0112833 A1 * | 5/2013 | Kim | B60N 2/0705 248/429 |

FOREIGN PATENT DOCUMENTS

| | | |
|---|---|---|
| EP | 0094438 A1 | 11/1983 |
| FR | 2852896 A1 | 10/2004 |
| WO | 2010080597 A1 | 7/2010 |

OTHER PUBLICATIONS

Chinese Office Action, Application No. 20111030074.2 dated Mar. 2, 2015.

* cited by examiner

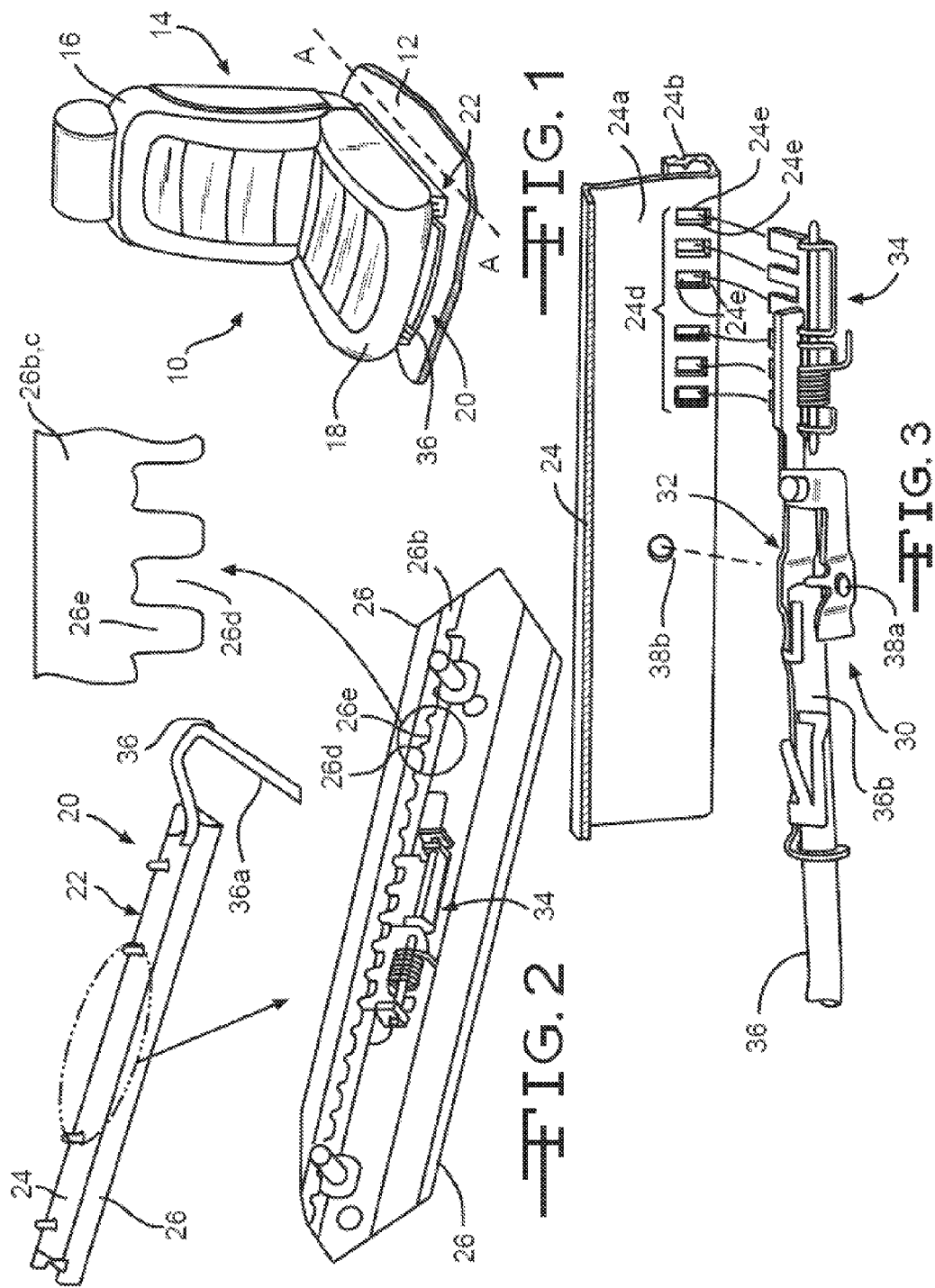

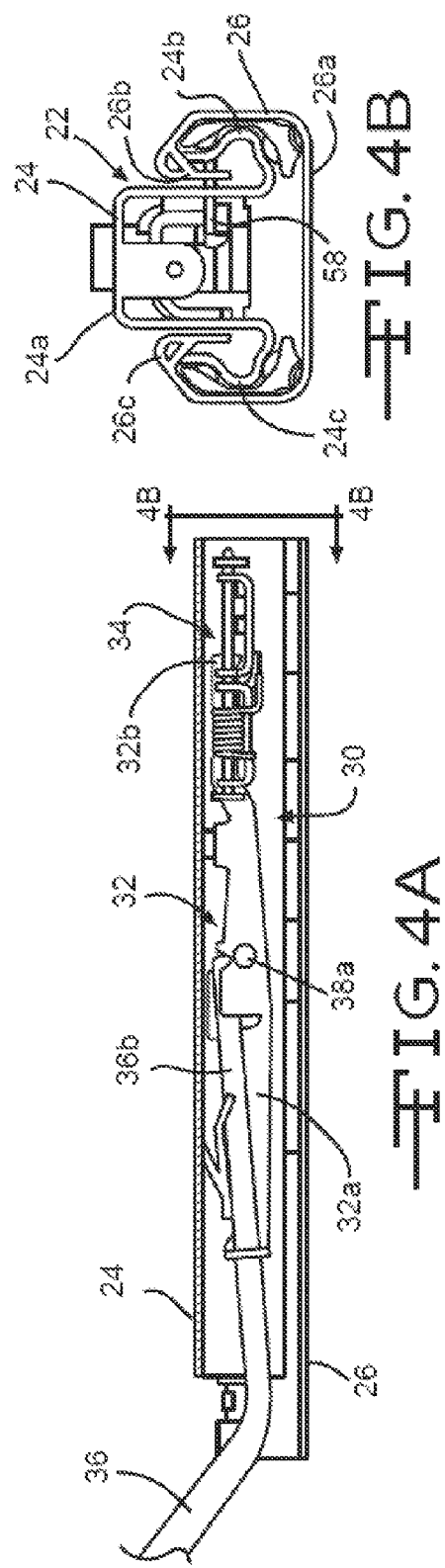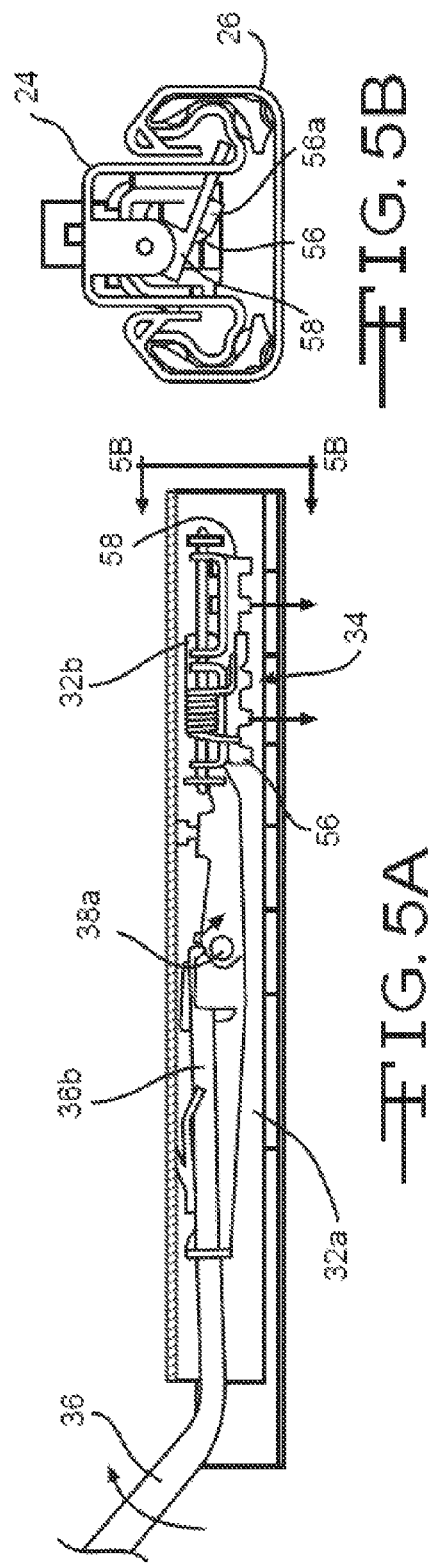

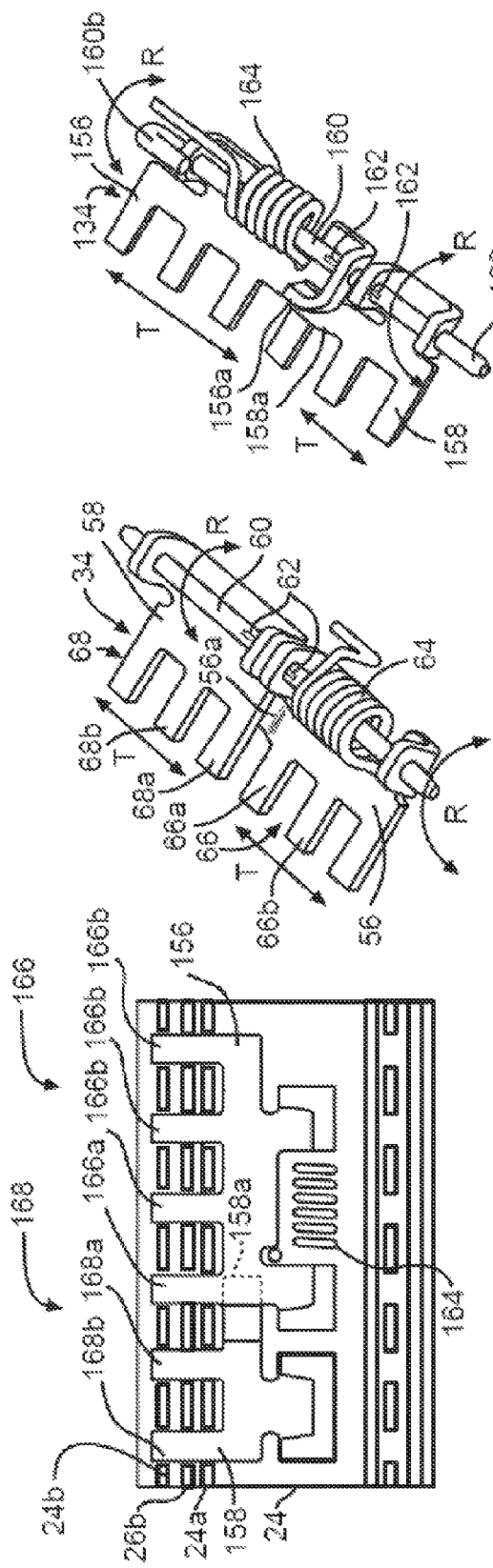

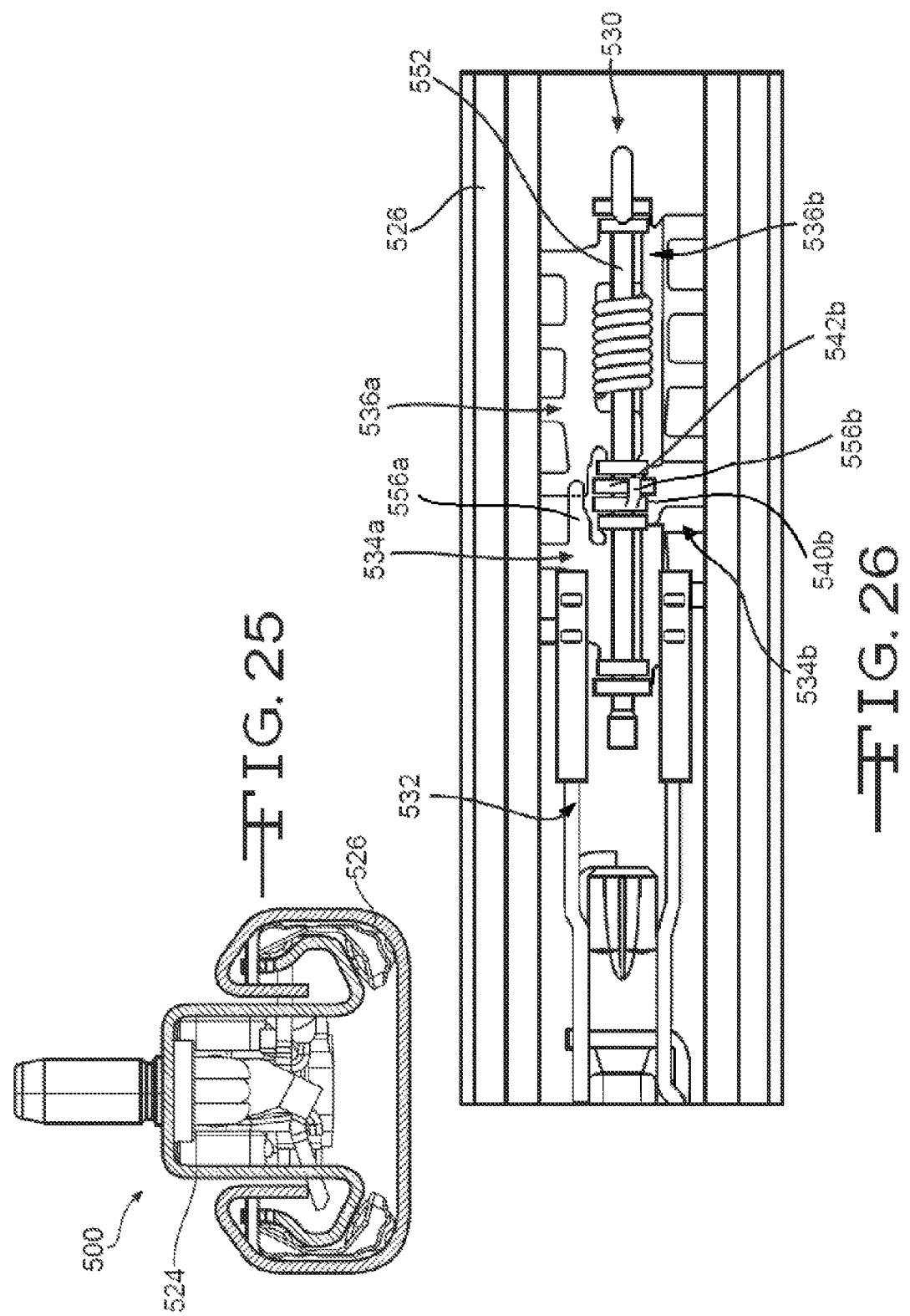

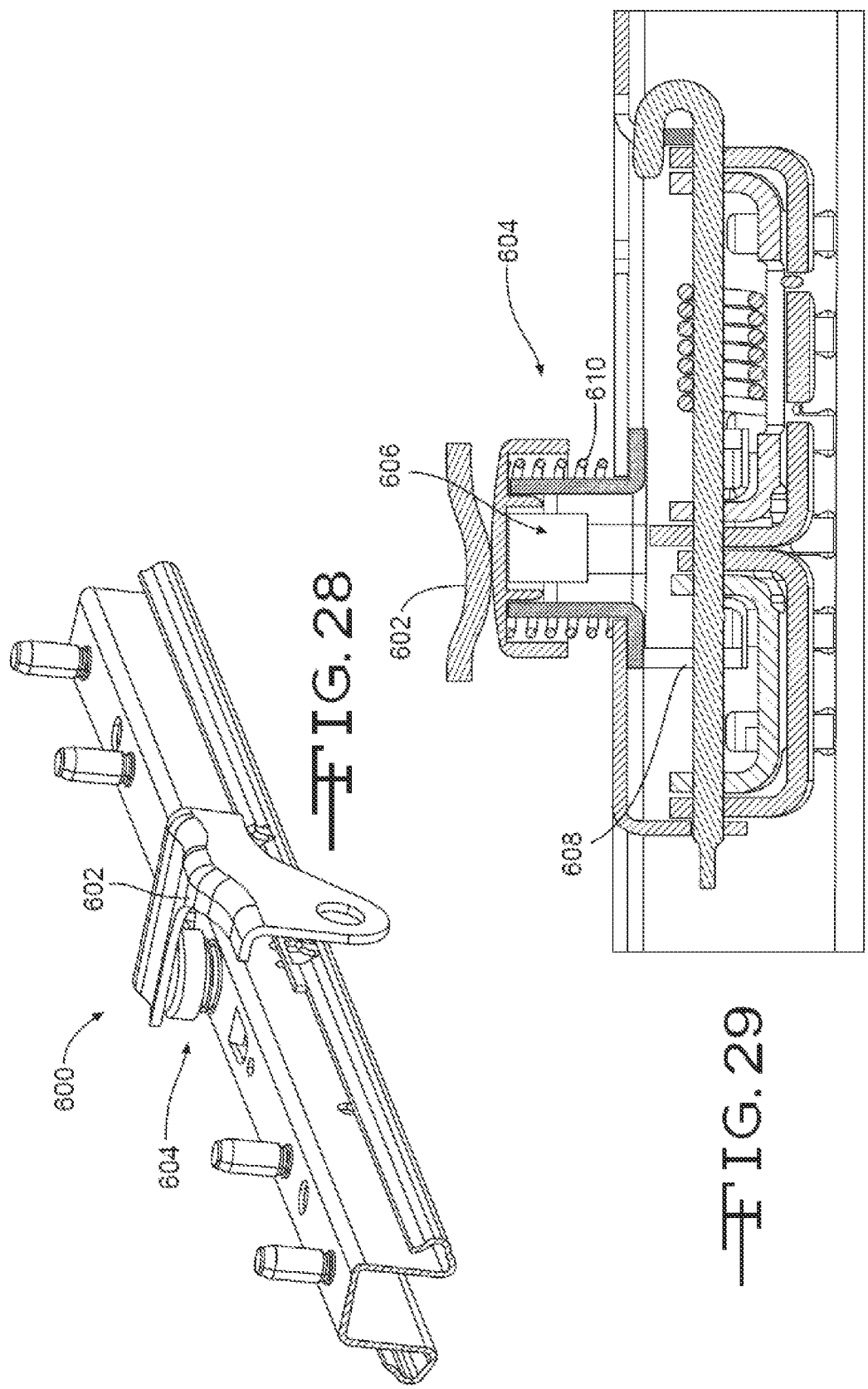

ADJUSTABLE SEAT TRACK HAVING TRACK ENGAGEMENT STRUCTURE

CROSS-REFERENCE TO RELATED APPLICATIONS

This application claims the benefit of U.S. Provisional Application No. 61/387,654, filed Sep. 29, 2010, the disclosure of which is incorporated herein by reference.

BACKGROUND OF THE INVENTION

This invention relates in general to seat track assemblies for adjusting the position of a seat relative to a surrounding structure, such as a vehicle. In particular, this invention relates to an improved latch mechanism for such a seat track assembly.

Seat track assemblies, particularly those used in vehicular applications, are provided to permit an occupant to position a seat relative to another structure, such as a steering wheel or a dashboard. Seat track assemblies are often embodied as a pair of longitudinally-oriented tracks or rails that are telescopically engaged with each other. One rail is mounted to a stationary structure, such as a vehicle floor pan. The other rail engages the seat and is movable relative to the stationary rail. The seat track assemblies are also provided with one or more latch assemblies that permit the desired seat position to be selectively fixed.

Many seat track assemblies employ openings that are formed through the movable and stationary rails. The openings cooperate with portions of the latch assembly to fix the relative position of the rails. The latch may have projections that engage the openings to provide a positive engagement. Often, the fit between the openings and the engaged portions of the latch assembly may have looseness. The looseness may result in residual movement or free play that can generate undesirable noises or vibrations. Thus, it would be desirable to provide a latch mechanism for a seat track assembly that reduces or eliminates a free play condition between latched seat rails.

SUMMARY OF THE INVENTION

This invention relates to seat track latching mechanisms, and more particularly, to seat track latching mechanisms that substantially reduce or eliminate free play between telescopically engaged, longitudinally adjustable seat rails. A seat adjustment apparatus includes a first rail having a plurality of openings that extend along a longitudinal axis. The openings are defined by spaced-apart locking surfaces. A second rail includes a plurality of complementary openings that extend along the longitudinal axis. The complementary openings are defined by spaced-apart locking surfaces. A locking mechanism having first and second locking portions is configured to engage the first and second rails. The first and second locking portions are selectively rotatable between a released position and a locked position. In the released position, the first and second rails can move freely relative to one another along the longitudinal axis. In the locked position, each of the first and second locking portions includes a plurality of teeth extending into the selected openings and complementary openings in the first and second rails to maintain the first rail in a selected position relative to the second rail. The first and second locking portions are further configured for relative axial movement along the longitudinal axis as the locking mechanism is moved from the released position to the locked position such that at least one of the teeth of each of the first and second locking portions are engageable with a respective locking surface to attenuate longitudinal free play between the first and second rails.

Various aspects of this invention will become apparent to those skilled in the art from the following detailed description of the preferred embodiments, when read in light of the accompanying drawings.

BRIEF DESCRIPTION OF THE DRAWINGS

FIG. 1 is a perspective view of a seat including an adjustable seat track assembly in accordance with this invention.

FIG. 2 is an enlarged perspective view of a portion of the seat track assembly illustrated in FIG. 1 showing a latch assembly.

FIG. 3 is an exploded view, in partial cross section, of a portion of the seat track latch assembly and actuator mechanism illustrated in FIGS. 1 and 2.

FIG. 4A is a side elevation view, in partial cross section, of the seat track and latch assembly of FIG. 3 shown in a locked position.

FIG. 4B is an end elevation view, in partial cross section, of the seat track and latch assembly of FIG. 4A.

FIG. 5A is a side elevation view, in partial cross section, of the seat track and latch assembly of FIG. 3 shown in a released position.

FIG. 5B is an end elevation view, in partial cross section, of the seat track and latch assembly of FIG. 5A.

FIG. 6 is a top view, in partial cross section, of an embodiment of a seat latch in engagement with portions of the seat track.

FIG. 7 is a perspective view of an embodiment of a latch plate assembly.

FIG. 8 is a perspective view of another embodiment of a latch plate assembly.

FIG. 9 is an enlarged view of a portion of the seat latch engaged with the seat track shown in FIG. 6.

FIG. 25 is an elevational view of another embodiment of a seat track assembly including a latch plate assembly, shown in a locked position.

FIG. 26 is a plan view of the seat track assembly of FIG. 25 showing the latch assembly and having a movable rail removed.

FIG. 28 is a perspective view of an alternative embodiment of a release mechanism to actuate embodiments of the latch assemblies in accordance with the invention.

FIG. 29 is a side elevational view, in cross section, of the release mechanism of FIG. 28.

DETAILED DESCRIPTION OF THE PREFERRED EMBODIMENTS

Figure 10:
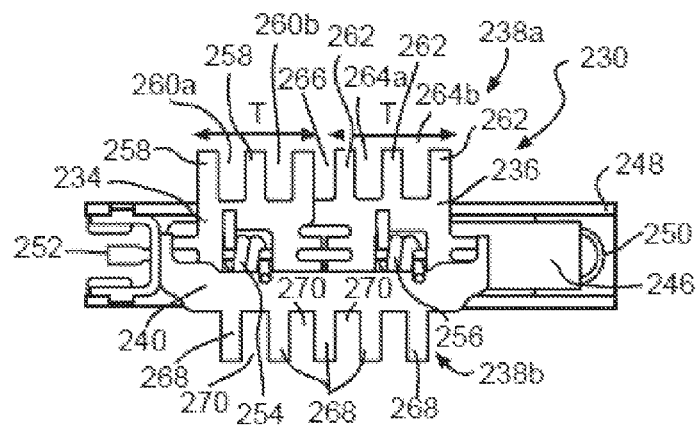
FIG. 10 is a side elevational view of another embodiment of a latch assembly including an embodiment of an actuation mechanism, mounting mechanism, and latch plate assembly.

Referring now to the drawings, there is illustrated in FIG. 1 a vehicle seat assembly, indicated generally at 10. The illustrated vehicle seat assembly 10 is mounted on a floor 12 or other support surface of a vehicle. The seat assembly 10 includes a vehicle seat, indicated generally at 14, having a seat back 16 that may be movable, such as pivotably attached, or fixed relative to a seat bottom 18. The seat bottom 18 is shown mounted onto an embodiment of a seat adjustment apparatus, indicated generally at 20, that includes an adjustable seat track assembly 22 that is configured for selective relative movement of the seat 14 relative to the floor 12. The adjustable seat track assembly 22 is shown as a longitudinally adjustable seat support having a first portion 24 that supports the seat 16 for relative movement and a second portion 26 that is attached to the floor 12 or another portion of the vehicle. The seat adjustment apparatus 20 is structured and configured to allow the seat 14 to be positioned, for example, in one or more longitudinal use positions along a track axis A.

Referring now to FIGS. 2-5B, there is illustrated the seat track assembly 22 where the first portion 24 is a movable rail that is adapted to engage the seat bottom 18 or any other suitable portion of the seat assembly 10. The second portion 26 of the seat track assembly 22 is configured as a stationary rail that is adapted to engage the floor 12 or any other suitable structure of the vehicle. The movable rail 24 is configured to move longitudinally along the track axis A relative to the stationary rail 26. The movable rail 24 is illustrated having a generally "U"-shaped section 24a and opposing, outwardly positioned, and spaced-apart walls 24b and 24c (see FIG. 4B). The U-shaped section 24a and at least one of the spaced apart walls 24b and 24c have a plurality of openings 24d formed therethrough. The shapes of the openings 24d is defined by spaced-apart surfaces 24e. The spaced-apart surfaces 24e of each opening 24d cooperate to define a perimeter of each opening. The openings 24d are illustrated as rectangular openings, though any shape suitable for a seat adjustment apparatus may be used.

The stationary rail 26 is illustrated having a generally "U"-shaped section 26a and opposing, inwardly positioned, and spaced-apart walls 26b and 26c that are generally parallel to the track axis A. At least one of the inwardly positioned, spaced-apart walls 26b and 26c includes a plurality of alternating openings 26d and teeth 26e that are disposed in a generally parallel orientation to the track axis A. The teeth 26e may be tapered from a wider base to a narrower tooth tip, as shown in FIG. 2. It should be understood that the cooperating movable and stationary rails 24 and 26 may have any cross sectional shape suitable for use as a seat adjustment apparatus. The seat track assembly 22 further includes a seat track latch assembly, shown generally at 30. The latch assembly 30 includes an actuation mechanism, shown generally at 32, and a latch plate assembly, shown generally at 34. As will be explained below, the spaced-apart walls 24b and 26b are provided on an active engagement side of the seat track assembly 22. Spaced-apart walls 24c and 26c are provided on a passive side of the seat track assembly 22. It should be understood that the designations of passive and active sides are for explanation purposes only, and the movable and stationary rails 24 and 26 may be configured other than described to permit the various embodiments of the latch assemblies to lock the relative position of the rails and eliminate undesired relative movement therebetween.

The actuation mechanism 32 and the latch plate assembly 34, as shown in FIGS. 4A-5B, are disposed within the space between the engaged movable and stationary rails 24 and 26 and are mounted on the movable rail 24. This arrangement permits a more compact assembly for easier packaging within the vehicle. The actuation mechanism 32 is movable to articulate the latch plate assembly 34 between a locked position, shown in FIGS. 4A and 4B, and a released position, shown in FIGS. 5A and 5B. Movement of the actuation mechanism 32 positions the latch plate assembly 34 into and out of engagement with at least the openings 26d of the stationary rail 26, as shown in FIGS. 4B and 5B. The actuation mechanism 32 engages an actuation handle 36, illustrated as a towel bar. The towel bar 36 is illustrated having a handhold portion 36a and an actuator interface portion 36b. The towel bar 36, however, may be any lever, cable, actuator, or other structure that can articulate either the actuation mechanism 32, or the latch plate assembly 34 directly, between the locked position and the released position relative to the rails 24 and 26.

Figure 16:
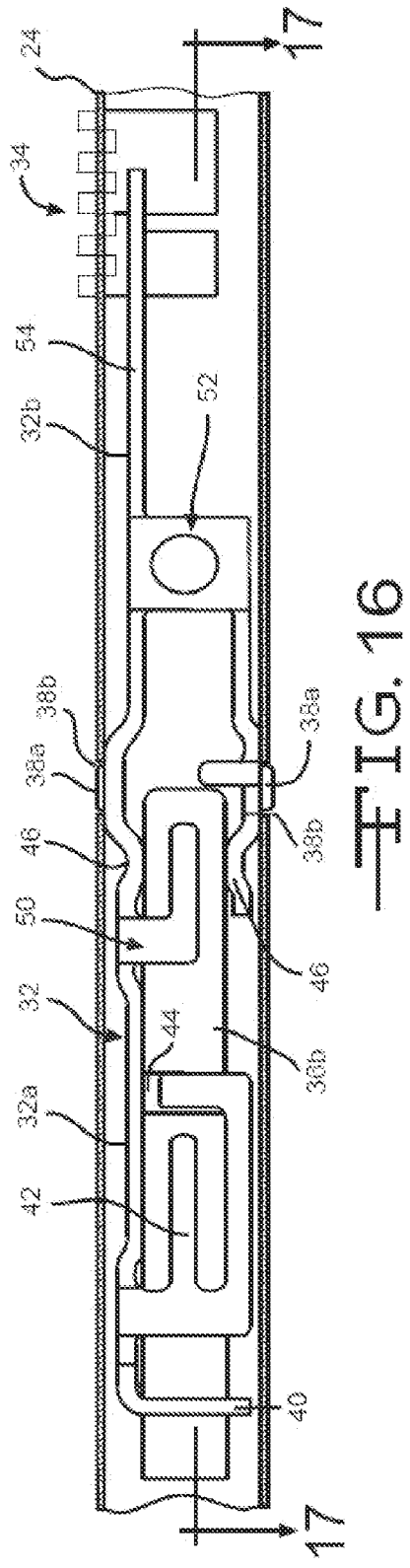
FIG. 16 is a schematic top view of an embodiment of an actuation mechanism mounted to a seat track.
Figure 17:
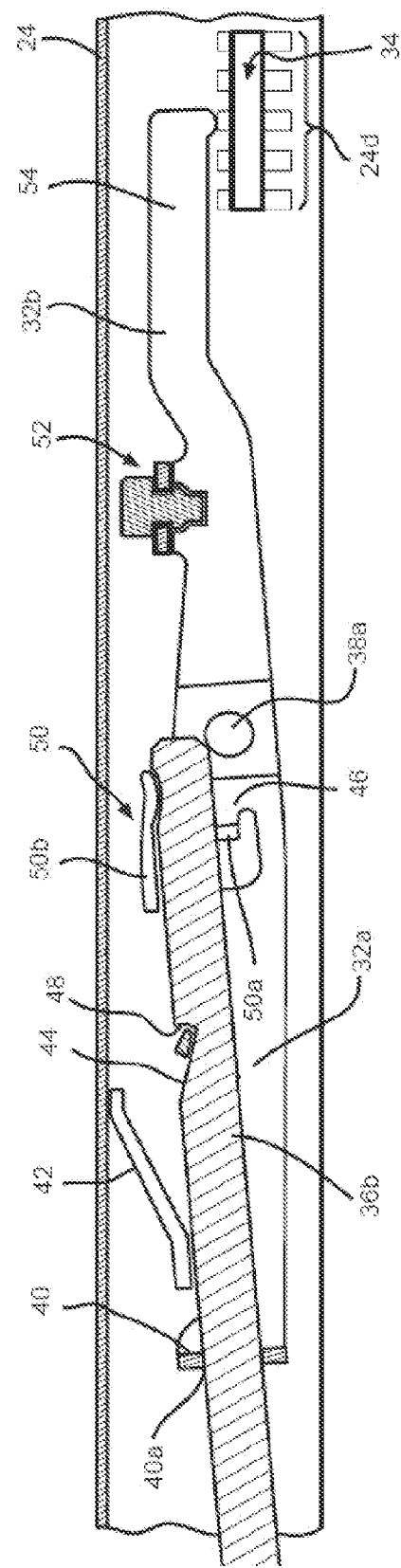
FIG. 17 is a schematic side view of the actuation mechanism of FIG. 16.

Referring now to FIGS. 16 and 17, the actuation mechanism 32 is illustrated having a handle mount portion indicated generally at 32a, a latch plate interface portion indicated generally at 32b, and two spaced apart pivot points 38a. The pivot points 38a are illustrated as round, outwardly projecting buttons that extend through two corresponding pivot apertures 38b formed into the movable rail 24. Though shown and described as cooperating protrusions and apertures, the actuation mechanism 32 may pivot relative to the movable rail 24 by way of any suitable structure such as, for example, a hinge, an axle, bearings, bushings, and the like.

The handle mount portion 32a of the actuation mechanism 32 is configured to engage and retain the actuator interface portion 36b of the towel bar 36. The handle mount portion 32a includes a front guide 40, a return spring 42, a handle lock 44, and pivot retainers 46. The front guide 40 is shown engaging the actuator interface portion 36b of the towel bar 36 at a forward-most point of the actuation mechanism 32. The front guide 40 is shown having an aperture 40a formed therethrough and serves to orient the towel bar 36 with the handle mount portion 32a. The front guide 40 further provides a first reaction point for the towel bar 36 to articulate the latch plate interface portion 32b when the towel bar 36 is moved to the release position.

The return spring 42 is illustrated as a cantilever spring that is integrally formed with the actuation mechanism 32. The return spring 42 biases the actuation mechanism 32 away from the latch plate assembly 34 such that the latch plate assembly 34 is free to be moved toward the locked position. It should be understood that any desired member may be used to bias the actuation mechanism 32 away from the latch plate assembly 34. The handle lock 44 is a resilient element that is biased toward engagement with a locking detent 48 formed in the actuator interface portion 36b. In the illustrated embodiment, the handle lock 44 snaps into engagement with the locking detent 48 as the actuator interface portion 36b of the towel bar 36 is inserted into the handle mount portion 32a of the actuation mechanism 32. However, the handle lock 44 and the cooperating locking detent 48 may be configured as any suitable retaining mechanism, including a fastener and aperture, a resiliently biased button and detent, and the like.

As the towel bar 36 is pushed into engagement with the actuation mechanism 32, the actuator interface portion 36b of the towel bar 36 makes contact with the pivot retainers 46. The pivot retainers 46 are spaced apart regions that frictionally engage the sides of the towel bar 36. The towel bar 36 spreads the pivot retainers 46 apart and further forces the pivot points 38a to remain engaged within the pivot apertures 38b. Once the towel bar 36 is engaged with the actuation mechanism 32, a rear guide 50 engages the end of the actuator interface portion 36b of the towel bar 36. The rear guide 50 is illustrated having a rear reaction point 50a and a retaining element 50b. The rear guide 50, however, may be configured as any structure that cooperates with the towel bar 36 to articulate the actuation mechanism 32. The front and rear guides 40 and 50 provide reaction points that transfer the movement of the towel bar 36 to the actuation mechanism 32.

The latch plate interface portion 32b of the actuation mechanism 32 includes an actuator end stop, indicated generally at 52, and a latch plate actuation arm 54. Though illustrated as having one latch plate actuation arm 54, a pair of arms may be provided, such as for latch plate assembly embodiments that will be described below. As the handle mount portion 32a of the actuation mechanism 32 is rotated about the pivot points 38a, the latch plate actuation arm 54 rotates into contact with the latch plate assembly 34 to move the latch plate assembly 34 to the released position. When the actuation mechanism 32 is positioned in the locked position, i.e. when the latch plate assembly 34 is in the locked position, the end stop 52 abuts a portion of the U-shaped section 24a of the movable rail 24. The end stop 52 is illustrated as a rubber bumper that contacts the upper portion of the movable rail 24 to limit rotational movement of the actuation mechanism 32.

Referring now to FIG. 7, there is illustrated an enlarged view of the seat track latch plate assembly 34. The latch plate assembly 34 is illustrated having first and second locking portions, which are illustrated in this embodiment as first and second latch plates 56 and 58, respectively. Though shown as having two latch plates 56 and 58, the latch plate assembly 34 may have more than two plates, if desired. The latch plates 56 and 58 are supported for rotational movement and translational movement by a hinge pin 60. The latch plates 56 and 58 may be free to slide on the hinge pin 60 in order to translate in a direction parallel to track axis "A" as shown by arrows "T." The latch plates 56 and 58 may translate apart or toward each other. The latch plates 56 and 58 also rotate about the hinge pin 60, as shown by arrows "R." The latch plates 56 and 58 are configured both to rotate and translate relative to one another and to rotate together, as required by the specific orientations of the openings 24d of the movable rail 24 relative to the openings 26d of the stationary rail 26.

In the embodiment illustrated in FIGS. 7 and 18-20, the hinge pin 60 includes retention tabs 62 that limit the translational movement of the latch plates 56 and 58 along the hinge pin 60. The retention tabs 62 are illustrated as localized upset regions of the hinge pin 60 that abut the pivot mounting portion of the latch plates 56 and 58. Alternatively, the retention tabs 62 may be a separate component such as, for example, a snap ring, a retaining nut, a spring clip, and the like. A resilient member 64 biases the plates 56 and 58 into the locked position with the movable rail 24 and the stationary rail 26. The resilient member 64 is illustrated as a coil spring but may be configured as any suitable resilient device such as, for example, a hair pin spring, an elastomeric spring, a torsion bar spring, and the like.

The latch plates are configured as a master plate 56 and a slave plate 58. In the illustrated embodiment, the master plate 56 is acted upon by the resilient member 64 and is biased into engagement with the movable and stationary rails 24 and 26. The master plate 56 includes a driving element 56a that contacts the slave plate 58. The driving element 56a is illustrated as a projecting tab that contacts one portion of the slave plate 58. The slave plate 58 is moved into engagement with the openings 24d and 26d of the rails 24 and 26 by the master plate 56. The slave plate 58 may engage the rails 24 and 26 in the same angular orientation or a different angular orientation than the master plate 56 when oriented in the locked position.

The latch plates 56 and 58 include a plurality of projecting teeth, shown generally in FIG. 7 at 66 and 68, respectively. The projecting teeth 66 and 68 are configured to engage the openings 24d and 26d that are aligned when the seat 14 is in the desired longitudinal use position, as shown in other embodiments such as the embodiment of FIG. 6. The projecting teeth 66 are illustrated having generally parallel sides. However, the sides may be tapered if desired. In the illustrated embodiment of FIG. 7, the teeth 66 of the master plate 56 are equal in number to the teeth 68 of the slave plate teeth 58, though such is not required.

The master plate teeth 66 may be comprised of drive teeth 66a and load teeth 66b. Similarly, the slave plate teeth 68 may be comprised of drive teeth 68a and load teeth 68b. The master plate 56 and the slave plate 58 may each have one drive tooth 66a and 68a and one load tooth 66b and 68b, though any number of drive and load teeth may be provided. When moved to the locked position, the teeth 66a and 66b extend into the aligned openings 24d and 26d of the rails 24 and 26. The drive tooth 66a is configured to engage at least one of the side surfaces 24e of the openings 24d and out least one of the sides 26e of the openings 26d. Such contact of the teeth 66a to the side surfaces of the openings 24d and 26d eliminates the free play relative movement between the movable and stationary rails 24 and 26 when in the locked position. The slave plate teeth 68 may also be configured similarly to extend into the openings 24d and 26d of the rails 24 and 26.

Referring now to FIG. 8, there is illustrated another embodiment of a latch plate assembly, indicated generally at 134. The latch plate assembly 134 includes a master plate 156 and a slave plate 158. The master plate 156 includes a drive element 156a that engages a driven element 158a of the slave plate 158. Alternatively, the drive element 156a may engage any portion of the slave plate 158. The master and slave plates 156 and 158 are supported for rotational and translational movement by a hinge pin 160. The hinge pin 160 includes a straight end 160a and a "J"-hook end 160b. A clearance exists between the drive element 156a and the driven element 158a such that the latch plates 156 and 158 may also translate in a direction parallel to track axis "A" as shown by arrows "T," similar to latch plates 56 and 58. The latch plates 156 and 158 may translate apart from or toward each other. The plates 156 and 158 also rotate about the hinge pin 160, as shown by arrows "R".

In another embodiment of the latch plate assembly 134, the clearance between the drive element 156a and the driven element 158a may be sufficiently large to permit the latch plates 156 and 158 may both to rotate and translate relative to one another, as required by the specific orientations of the movable rail 24 relative to the stationary rail 26. Alternatively, the clearance may be small such that the master and slave plates 156 and 158 generally rotate together and are free to translate relative to one another. The master plate 156 is acted upon by a resilient element 164 and is biased into an engagement position with the movable and stationary rails 24 and 26. The master plate 156 subsequently drives the slave plate 158 into the engagement position with the rails 24 and 26 similar to the latch plate assembly 34, described above. The latch plates 156 and 158 may be retained onto the hinge pin 160 by optional retention tabs 162. The optional retention tabs 162 are similar to retention tabs 62 described above.

The master plate 156 is illustrated having four teeth 166 and the slave plate 158 is illustrated having two teeth 168. However, the master and slave plates 156 and 158 may have any number of teeth. As shown in FIG. 9, the master plate teeth 166 are provided as drive teeth 166a ("dt") and load teeth 166b ("lt"), similar in function to the drive and load teeth 66a and 66b above. Likewise, the slave plate 158 may include both drive and load teeth 168a ("dt") and 168b ("lt"), similar to the drive and load teeth 68a and 68b above.

As shown in FIGS. 6 and 9 and with reference to the second embodiment latch plate assembly 134, the drive teeth 166a of the master plate 156 are configured to make initial contact with one of the spaced apart side surfaces 24e of the openings 24d that are formed through the U-shaped section 24a and the spaced-apart walls 24b and 24c of the movable rail 24. The drive teeth 166a further make secondary contact with the sides of the teeth 26e as the drive teeth 166a extend through the openings 26d formed on one of the opposing spaced-apart walls 26b and 26c of the stationary rail 26. As shown in FIG. 9, the load teeth 166b extend into the openings 24d and 26d without contacting one or both of the side surfaces 24e and the teeth 26e. The load teeth 166b may contact one or both of the side surfaces 24e and the teeth 26e, if so configured. The drive tooth 166a of the master plate 156 may be spaced apart from the load teeth 166b with a different pitch, or spaced dimension, than the load teeth 166b are spaced apart from each other. Similarly, the drive tooth 168a of the slave plate 158 may be spaced apart from an adjacent load tooth 168b differently than the spacing of the load teeth 168b to each other.

The embodiments of the latch plate assemblies 34 and 134 described above may also be used in a tandem orientation. Such a tandem orientation may include latch plates (not shown), configured as master and slave plates, that are spaced apart from the master and slave plates 56 and 58 or the master and slave plates 156 and 158. The tandem oriented master and slave plates may pivot about the same hinge pin, for example hinge pin 60, though such is not required. In such a tandem arrangement, a resilient member (not shown), similar to resilient member 64 may be configured to apply a biasing force between the tandem oriented latch plates. Alternatively, two resilient members may separately bias the tandem latch plates into a locked position. The separate resilient members may react against a portion of the rail that supports the latch assembly, such as the U-shaped section 24a of the movable rail 24.

The following description of operation is for illustration purposes only. The sequence of specific component interactions may be other than that described herein. As the drive teeth 166a enter into the openings 24d and 26d, contact is first made between one drive tooth 166a and, for example, the side of the tooth 26e in the spaced-apart wall 26b of the stationary rail 26. As the drive teeth 166a continue to rotate into the locked position, contact with the tapered tooth 26e causes the master plate 156 to translate along the track axis A. The master plate 156 translates until the opposite side of the tooth 166a contacts the side surface 24e of the opening 24d of the movable rail 24. This movement causes the drive tooth 166a to wedge between the side surface 24e of opening 24d and the side of the tapered tooth 26e of the rails 24 and 26, as indicated by arrows B. The wedging action of the drive tooth 166a with the opposing spaced apart sides 24e and tapered tooth 26e eliminates free play or relative movement between the rails 24 and 26.

The master plate 156 urges the slave plate 158 into the locked position by way of the drive element 156a. The drive tooth 168a of the slave plate 158 engages the openings 24d and 26d in a similar manner to the drive tooth 166a. Continued rotational movement causes engagement of the drive tooth 168a with the tapered sides of one of the teeth 26e of the stationary rail 26. This contact further causes the slave plate 158 to translate along track axis A relative to the master plate 156. Further engagement of the drive tooth 168a with one of the tapered teeth 26e causes the slave plate 158 to translate. The drive tooth 168a then contacts the side surface 24e of one of the openings 24d formed in the U-shaped section 24a of the movable rail 24. The drive tooth 168a is effectively pinched between at least one of the side surfaces 24e and at least one of the tapered sides of the teeth 26e. Thus, the pinched or wedged drive teeth 166a and 168a eliminate the free play condition between the movable and stationary rails 24 and 26 along the track axis A.

The load teeth 168b of the slave plate 158 extend into to the openings 24d and 26d. The load teeth 166b and 168b are provided for load transfer in the event of a sufficiently high g-force event. During a sufficiently high g-force event, with the latch plate assembly 134 in the locked position, the drive teeth 166a and 168a that are in contact with the side walls 24e of openings 24d and the tapered teeth 26e may deflect from the shear loading of the movable rail 24 moving relative to the stationary rail 26. As the teeth 166a and 168a deflect, the movable and stationary rails 24 and 26 move relative to each other. As the rails move, the load teeth 166b and 68b make contact with the side walls 24e of openings 24d and the tapered teeth 26e and are similarly loaded. Thus, the drive teeth 166a and 168a function to actively engage the movable and stationary rails 24 and 26 such that free play movement therebetween is eliminated. The load teeth 166b and 168b provide passive engagement with the movable and stationary rails 24 and 26 to further distribute the loads of a high g-force event to other portions of the stationary rail 26 and the floor 12.

Referring now to FIGS. 10-15, there is illustrated another embodiment of a seat track latch assembly, shown generally at 230. As shown in FIG. 10, the seat track latch assembly 230 includes a first latch plate 234 and a second latch plate 236 that cooperate as an active track engagement side, indicated generally at 238a. The seat track latch assembly 230 includes a third latch plate 240 that is configured as a passive track engagement side, indicated generally at 238b. Active track engagement is defined as the interaction of portions of the first and second latch plates 234 and 236 with portions of the movable and stationary rails 24 and 26 such that relative movement between the rails 24 and 26 is eliminated. The elimination of relative movement may result from contact between portions of the rails 24 and 26 with projecting portions of the latch plates 234 and 236. Passive track engagement is defined as the interaction of the third latch plate 240 with portions of the movable and stationary rails 24 and 26 such that no substantial impediment to engagement of the latch plate 240 with the rails 24 and 26 results from the interaction therebetween.

The seat track latch assembly 230 includes a mounting plate 242 having a hinged end 244 and an actuating end 246. The hinged end 244 supports a release lever 248 for relative rotation to the mounting plate 242 by any suitable structure. The release lever 248 is operative to actuate the first, second, and third latch plates 234, 236, and 240 from a latched position to an unlatched position. The actuating end 246 may include a resilient member 250 to support and bias the release lever 248 in a latch engagement position. The first latch plate 234 is configured as a master plate and the second latch plate is configured as a slave plate, similar in form and function to the master and slave plates 56 and 58 described above.

The first, second, and third latch plates 234, 236, and 240 are supported for rotation relative to the mounting plate 242 by a hinge pin 252. In one embodiment, the first and second latch plates 234 and 236 are free to translate along a portion of the hinge pin 252. A first reaction member 254, illustrated as a first torsional coil spring, is engaged between the first latch plate 234 and the third latch plate 240. The first reaction member 254 has a first spring rate characteristic. A second reaction member 256, illustrated as a second torsional coil spring, is engaged between the second latch plate 36 and the third latch plate 240. The second reaction member 256 has a second spring rate characteristic that is different from the first spring rate characteristic, though such is not required. In a preferred embodiment, the first reaction member 254 is stiffer, i.e. produces a larger magnitude reaction load, than the second reaction member 256, however such is not required. The first and second reaction members 254 and 256 are not limited to torsional coil springs, as illustrated, and may be any resilient or load biasing structure.

The first latch plate 234 includes a plurality of teeth 258 that extend in a direction away from the hinge pin 252 and alternating spaces 260a and 260b. The plurality of first locking teeth 258 are shown having three teeth. However, any number of teeth may be used. In the illustrated embodiment, locking teeth 258 are shown having the same width-dimension. The alternating space 260a may be a different width dimension than alternating space 260b, though such is not required.

The second latch plate 236, likewise, is illustrated having a plurality of locking teeth 262 that extend in a direction away from the hinge pin 252. Alternating spaces 264a and 264b are located between the plurality of locking teeth 262. In the illustrated embodiment, locking teeth 262 are also the same width-dimension. The alternating space 264a of the second latch plate 236 is a different width dimension than the alternating space 264b (in the direction between adjacent teeth 262), though such is not required Alternatively, the alternating spaces 260a and 260b of the first latch plate 234 may be the same size. In another alternative embodiment, the alternating spaces 264a and 264b of the second latch plate 36 may be the same size, if so desired. Alternatively, the teeth 258 and 262 may be of different widths and the spaces 260a, 260b, 264a, and 264b may be of the same width.

Figure 13:
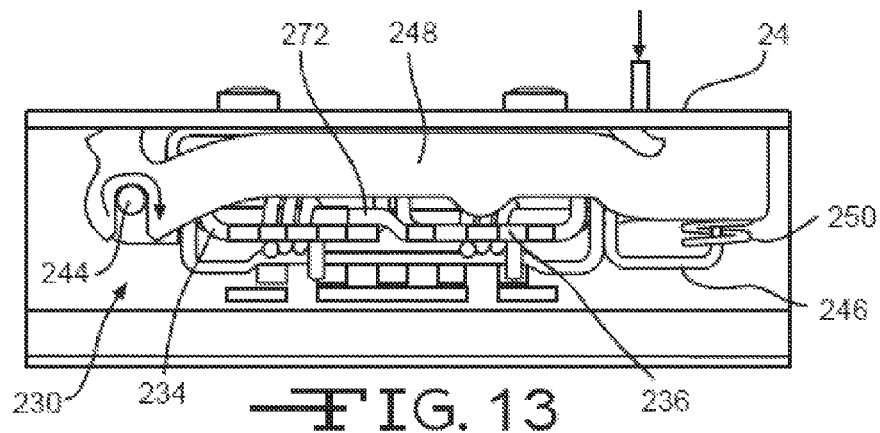
FIG. 13 is a side elevation view of an embodiment of a latch assembly including the latch plate assembly of FIG. 10.

As shown in FIG. 13, the second latch plate 236 includes a driving element 272 (see FIG. 13), similar in function to the driving element 56a described above. The driving element 272 extends over and into contact with the first latch plate 234. The driving element 272 is contacted by the first latch plate 234 and applies an additive force, generated by the first resilient member 254 during engagement, to the second latch plate 236. Such a force facilitates engagement of the teeth 262 with the movable and stationary rails 24 and 26. The driving element 272 further allows the release lever 248 to release both latch plates 234 and 236 with one point of contact. Alternatively, the driving element 272 may be part of the first latch plate 234 and positioned under the second latch plate 236, if desired. In another alternative arrangement, the driving element 272 may be positioned to allow the second latch plate 236 to apply a force onto the first latch plate 234 during engagement, if so desired. The driving element 272 may also be optional and the release lever 248 may include separate points of contact to actuate the first and second latch plates 234 and 236.

The teeth 258 and 262 are illustrated extending in the same direction. A junction space 266 (see FIG. 10) is provided between the second latch plate 236 and the first latch plate 234, though such a specific arrangement is not required. Though illustrated as part of the second latch plate 236, the junction space 266 may be provided as part of the first latch plate 234. The junction space 266 may be a different dimension than the alternating spaces 260a, 260b, and 264a, 264b or alternatively may be the same as one of the spaces 260a, 260b, and 264a, 264b. The junction space 266 may change width dimension in response to the relative translation of the first and second latch plates 234 and 236 along the hinge pin 252.

The third latch plate 240 includes a plurality of teeth 268, illustrated as five teeth, that extend in a direction away from the hinge pin 252. It should be understood that the third latch plate 240 may be more than one plate and may have any number of teeth 268 desired. The teeth 268 preferably extend in a generally opposite direction to that of teeth 258 and 262, though such is not required. A plurality of spaces 270 are disposed between adjacent teeth 268. The teeth 258, 262, and 268 are illustrated as having the same width, though such is not required. The spaces 270 may be the same width as any one of the spaces 260a, 260b, and 264a, 264b or may be a different width if so desired.

Figure 14:
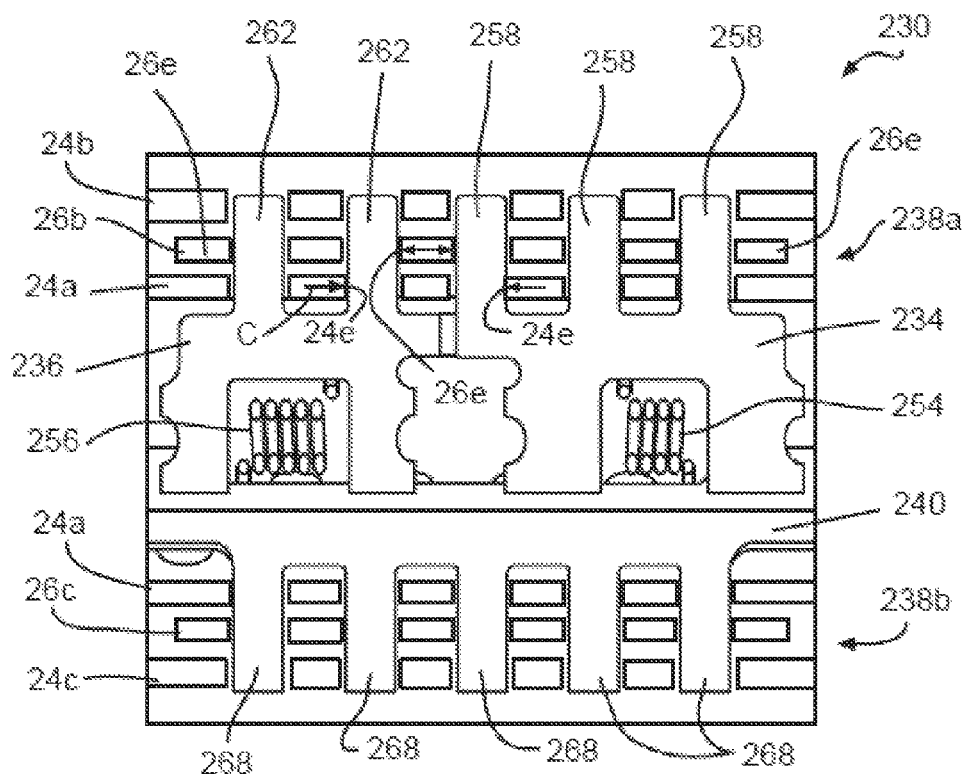
FIG. 14 is a top view, in partial cross section, of the seat latch of FIG. 10 in engagement with portions of the seat track.
Figure 15:
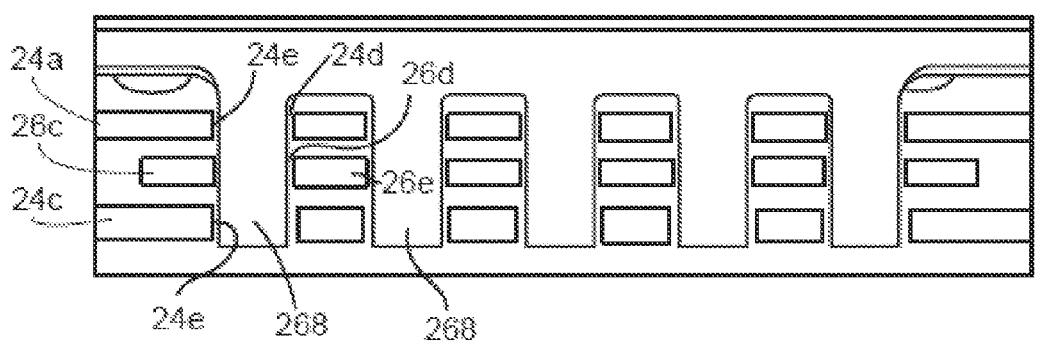
FIG. 15 is an enlarged view of FIG. 14 showing a portion of the seat latch engaged with the seat track.

Referring now to FIGS. 14 and 15, there is illustrated a schematic cross sectional view of the seat track latch assembly 230 shown in an engaged position within the movable rail 24 and the stationary rail 26. The active track engagement side 238a of the movable rail 24 includes the plurality of openings 24d formed through the U-shaped portion 24a and through the spaced-apart, upstanding walls 24b,c. The teeth 258 and 262 extend into the openings 24d and 26d of the movable and stationary rails 24 and 26 when actuated into the locked position. At least one of the teeth 258 and at least one of the teeth 262 each contact one of the spaced apart side walls 24e of the openings 24d in the U-shaped portion 24a. The same teeth 258 and 262 additionally contact one of the tapered teeth 26e of the stationary rail 26, as indicated by arrows "C" when engaged in the locked position. The contact between the active side 238a of the latch plate assembly 234 and the openings 24d and 26d indicated by arrows C prevents free play or relative movement between the movable rail 24 and the stationary rail 26.

As shown in FIG. 15, the passive side 238b of the latch plate assembly 234 engages portions of the movable and stationary rails 24 and 26. The teeth 268 extend into the openings 24d formed through the U-shaped section 24a (the side opposite to the active side) and the opposing, outwardly positioned, and spaced-apart wall 24c. Though the passive side openings 24d are referenced as having the same configuration as the active side openings 24d, the windows may be configured differently if desired. As shown in FIG. 15, a gap may exist on both sides the teeth 268 relative to the openings 24d and 26d. This permits free movement of the third latch plate 240 of the passive side 238b to help provide full engagement of the teeth 268 when actuated into the latched position. Additionally, the teeth 268 are generally oriented nearly perpendicular relative to the adjacent sides of the openings 24d and 26d. Thus, load transfer during a high g-force event has a reduced impact at the base of the locking teeth 268. The engagement of the teeth 268 with the openings 24d and 26d of the passive side 238b provides a load sharing function, relative to the engaged active side 238a, during a high g-force event. This load sharing function allows for a reduced material thickness requirement for the movable and stationary rails 24 and 26, if desired.

Referring back to FIGS. 11 and 12, the seat track latch assembly 230 is shown mounted to the upper portion of the U-shaped section 24a, which is also configured to be mounted to the seat 14. The latch plate assembly 230 is shown in the engaged or latched position in FIG. 11 and in the disengaged or unlatched position in FIG. 12. In the unlatched position, the first and second latch plates 234 and 236 are moved out of engagement with the teeth 26e of the stationary rail 26 on the active engagement side 238a. In a similar manner, the third latch plate 240 is also moved out of engagement with the teeth 26e of the stationary rail 26 on the passive engagement side 238b.

Figure 11:
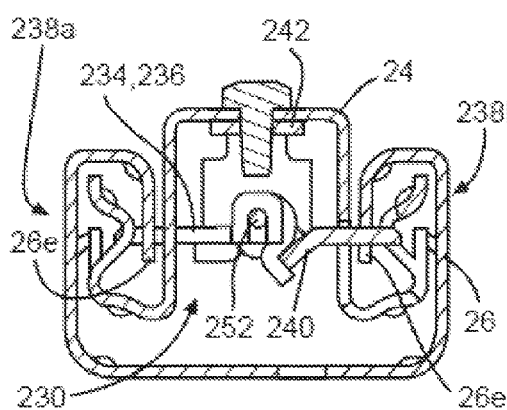
FIG. 11 is an end elevation view of a seat track assembly including the latch plate of FIG. 10 shown in a locked position.
Figure 12:
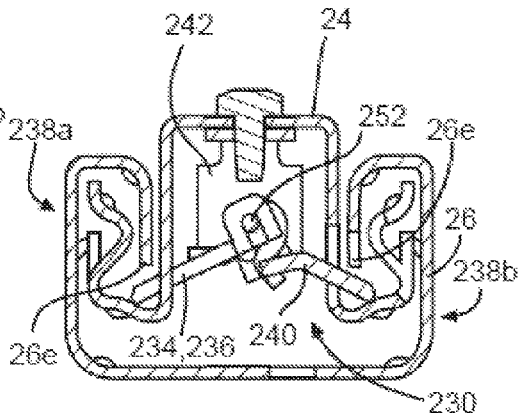
FIG. 12 is an end elevation view of a seat track assembly including the latch plate of FIG. 10 in a released position.

The latch plates 234, 236, and 240 are actuated by the release lever 248. When actuated, the release lever 248 rotates the latch plates 234, 236, and 240 about the hinge pin 252. As shown in FIG. 12, the first and second latch plates 234 and 236 are rotated together (i.e. simultaneously) and in an opposite direction of the rotation of the third latch plate 240. When the latch plates 234, 236, and 240 are actuated by the release lever 248, the movable rail 24 is permitted to translate or otherwise move relative to the stationary rail 26. When reengaged, as shown in FIG. 11, the movable rail 24 is restrained or otherwise prevented from translating relative to the stationary rail 26. As previously mentioned, the passive side plate 240 provides an additional load transfer function during a high g-force event, similar to the load teeth 166b and 168b, described above.

Figure 18:
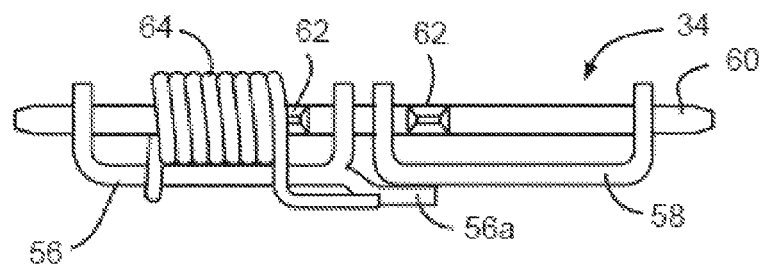
FIG. 18 is an elevational view of a latch plate assembly prior to installation in a seat track.
Figure 19:
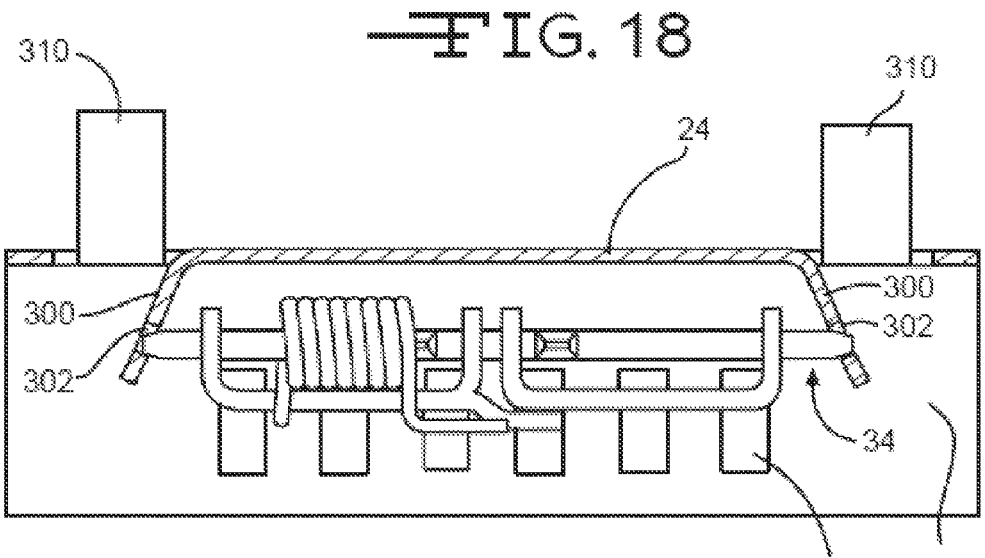
FIG. 19 is an elevational view of an intermediate step in a method of assembling the latch plate assembly of FIG. 18 to the seat track.
Figure 20:
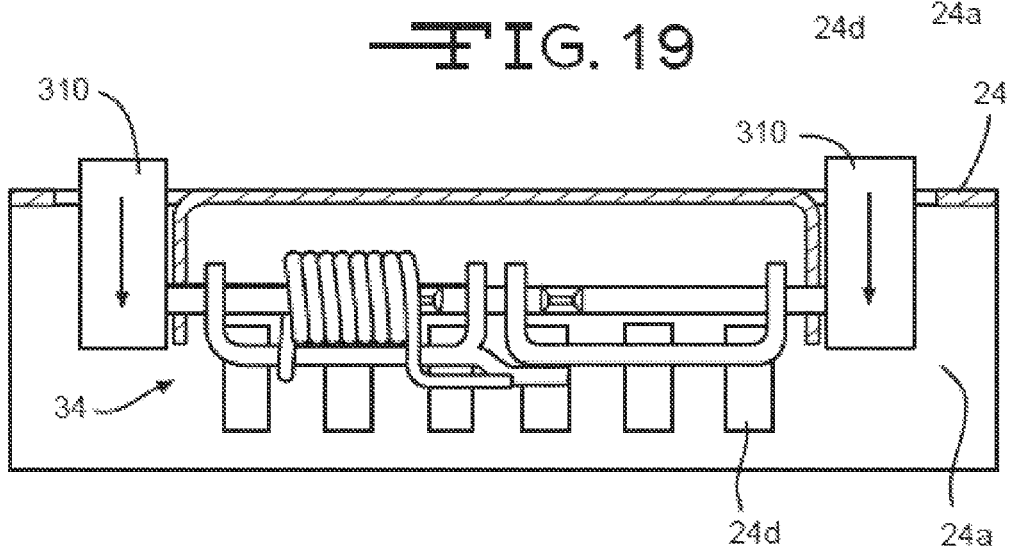
FIG. 20 is an elevational view of another step in the method of assembling the latch plate assembly of FIG. 18 to the seat track.
Figure 21:
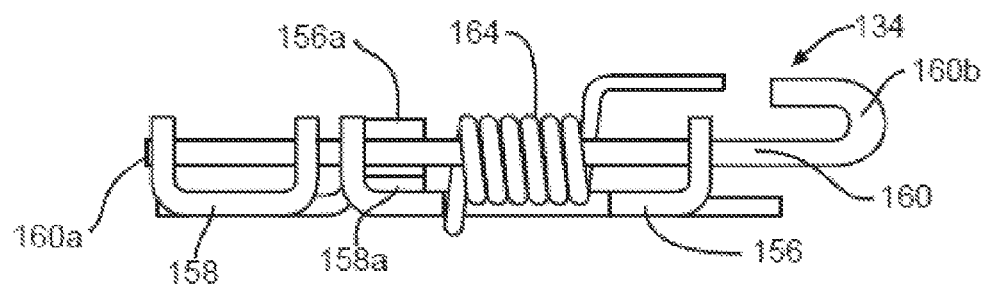
FIG. 21 is an elevational view of another embodiment of a latch plate assembly prior to installation in a seat track.

Referring now to FIGS. 18-20, there is illustrated an embodiment of a method of assembling the latch plate assembly 34 to the movable rail 24. The latch plate assembly 34 is positioned within the U-shaped section 24a of the movable rail 24. A pair of mounting tabs 300 are formed from the upper portion of the U-shaped section 24a. The mounting tabs 300 are shown as substantially identically shaped. However, the mounting tabs 300 may be shaped differently. The mounting tabs 300 may be formed by stamping, coining, cutting, milling, or other suitable processes. A hinge pin mounting aperture 302 is also formed through each of the mounting tabs 300. Die punches 310 are moved to fold or otherwise bend the tabs 300 such that the apertures 302 align with and engage the ends of the hinge pin 60. The tabs 300 are folded onto each end of the hinge pin 60 to trap or retain the latch plate assembly 34 therebetween. The ends of the hinge pin 60 may be tapered to facilitate engagement of the hinge pin 60 into the apertures 302.

In an alternative embodiment, the tabs 300 may be fully formed tabs that are subsequently attached to one of the movable and stationary rails 24 and 26. The tabs 300 may be attached by any appropriate method or structure such as, for example, bolts, screws, adhesives, welds, and the like. Alternatively, the tabs 300 may also be formed as a single mounting structure that is attached in a similar manner to one of the rails.

In the embodiment illustrated in FIG. 20, the die punches 310 continue through into the space under the U-shaped section 24a to fold the mounting tabs completely over. In addition, the die punches 310 may upset or otherwise deform the ends of the hinge pins to form a positive retention feature thereon. In one embodiment, the positive retention feature may be flattened ends of the hinge pin 60 Alternatively, the hinge pin 60 may be positively retained by circlips, snap rings, spring clip, nuts, and the like. The hinge pin 60 may further not include any positive retention feature if desired.

Referring now to FIGS. 21-24, there is illustrated another embodiment of a method of assembling the latch plate assembly 134 to the movable rail 24. Similar to the method described above, two mounting tabs 400 and 402 are formed. Mounting tab 400 is illustrated similar in shape to the mounting tabs 300 and includes a hinge pin mounting aperture 404. Mounting tab 402 is illustrated being folded in the same direction and orientation as mounting tab 400. The mounting tab 402 includes a J-hook mounting aperture 406 that is shown in a closer position to the top of the U-shaped section 24a than the hinge pin mounting aperture 404. The mounting tabs 400 and 402 are formed and bent into position prior to inserting the latch plate assembly 134 into the movable rail 24.

Figure 22:
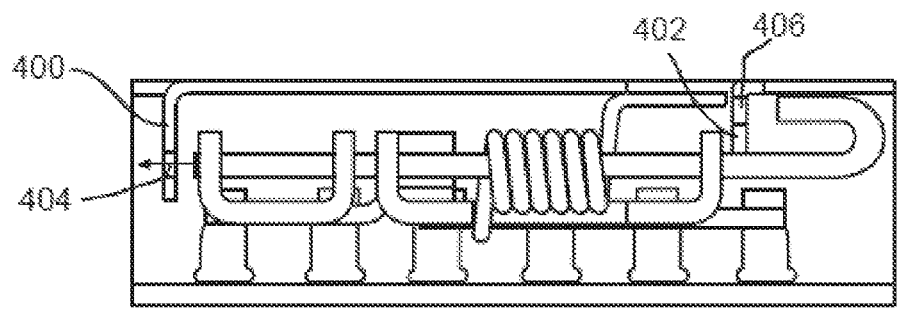
FIG. 22 is an elevational view of an alignment step in a method of assembling the latch plate assembly of FIG. 21 to the seat track.
Figure 23:
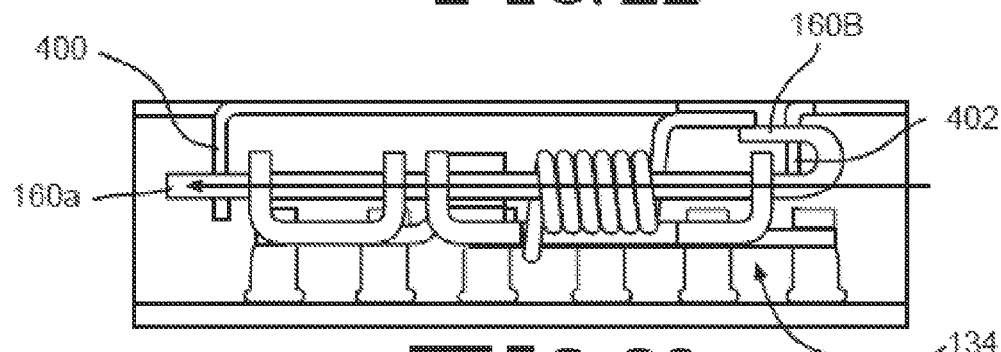
FIG. 23 is an elevational view of an installation step in a method of assembling the latch plate assembly of FIG. 21 to the seat track.
Figure 24:
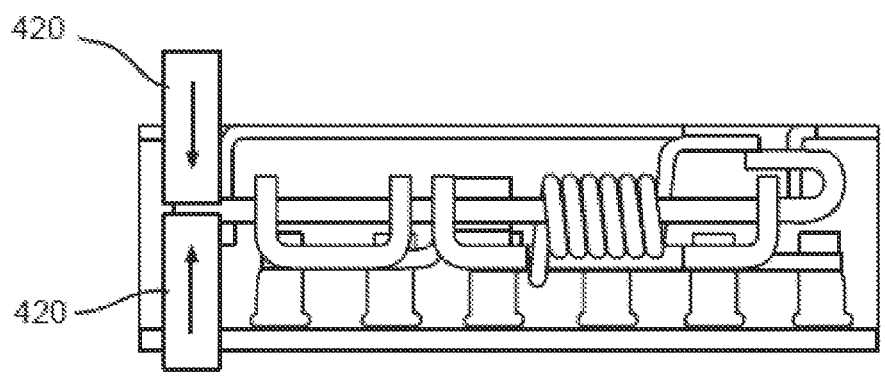
FIG. 24 is an elevational view of a securement step in a method of assembling the latch plate assembly of FIG. 21 to the seat track.

As shown in FIGS. 22 and 23, the latch plate assembly 134 is positioned within the movable rail 24. The hinge pin end 160a is aligned with hinge pin mounting aperture 404, and the open end of the J-hook 160b is aligned with the J-hook mounting aperture 406. The hinge pin 160 is moved into engagement with the mounting apertures 404 and 406. The hinge pin end 16b extends beyond the mounting tab 400 such that a forming tool 420 may be moved to flatten or otherwise upset the hinge pin end 160a to prevent the hinge pin 160 from disengaging the mounting tabs 400 and 402. Alternatively, the hinge pin 160 may be mechanically retained as described above.

Figure 27:
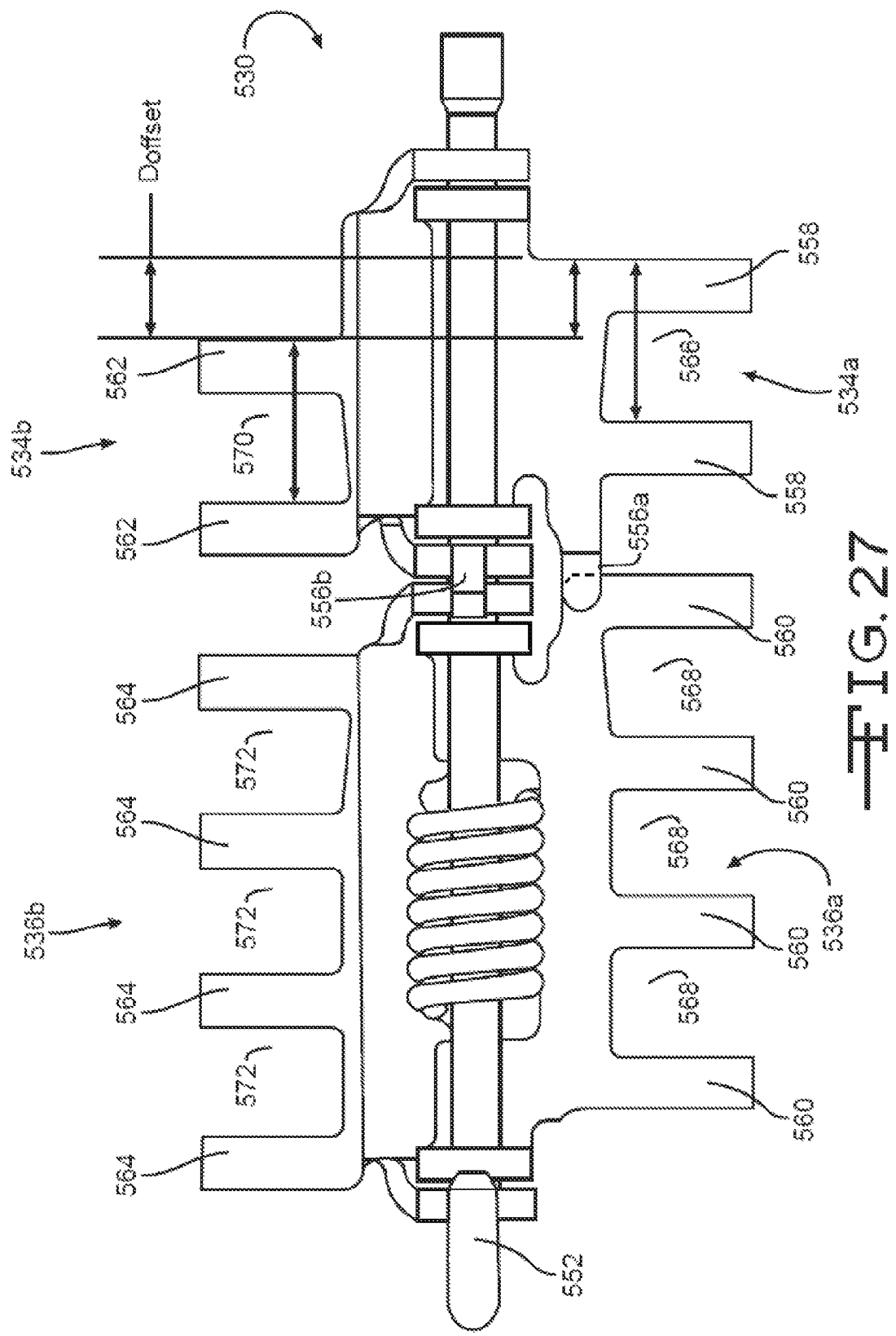
FIG. 27 is an enlarged plan view of the latch plate assembly of FIG. 26.

Referring now to FIGS. 25-27, there is illustrated another embodiment of a seat track assembly, shown generally at 500. The seat track assembly 500 includes a movable rail 524 and a stationary rail 526, similar to the movable and stationary rail embodiments described above. The seat track assembly 500 further includes a seat latch assembly, shown generally at 530 and an actuation mechanism, shown generally at 532. The latch assembly 530 includes first and second locking portions. The first locking portion of the latch assembly 530 includes a first latch plate 534a configured as a master latch plate and a second latch plate 536a configured as a slave latch plate. The second locking portion of the latch assembly 530 includes a third latch plate 534b and a fourth latch plate 536b that may also be configured as master and slave latch plates, respectively. In the illustrated embodiment, the first and second latch plates 534a and 536a are arranged to operate independently of the third and fourth latch plates 534b and 536b. Thus, the first and second latch plates 534a and 536a not configured to drive or be driven by the third and fourth latch plates 534b and 536b. The first, second, third, and fourth latch plates 534a, 536a, 534b, and 536b are configured to rotate about a hinge pin 552, similar to the embodiments described above. The master latch plate 534a includes a driving element 556a that contacts the slave latch plate 536a and functions similarly to the driving element 56a described above. The master latch plate 534b also includes a driving element 556b. In the illustrated embodiment, the driving element 556b extends from a hinge ear 540b of the master latch plate 534b and extends across a hinge ear 542b of the slave latch plate 536b. The driving element 556b is offset from a plane that is perpendicular to the plane of the teeth of the master latch plate 534b to permit a greater degree of relative rotation between the master and slave latch plates 534b and 536b in one rotational direction than in the opposite rotational direction. In another embodiment, the driving element 556b, however, may be configured similarly to the driving element 556a, if desired.

The master latch plate 534a includes a plurality of teeth 558 that extend away from the hinge pin 552. The teeth 558 are separated by a space 566. The slave latch plate 536a also includes a plurality of teeth 560 that are separated by spaces 568. In one embodiment, the spaces 566 and 568 are generally the same dimension. In another embodiment, the spaces 566 are of a different dimension than the spaces 568. The master latch plate 534b also includes a plurality of teeth 562 that extend away from the hinge pin 552 in a generally opposite direction from the teeth 558, when the latch assembly 530 is viewed in the closed or latched position. The teeth 562 are separated by a space 570. The space 570 is illustrated as having the same general dimension as the space 566. The slave latch plate 536b also includes a plurality of teeth 564 that extend away from the hinge pin 552 in a generally opposite direction from the teeth 560, when the latch assembly 530 is viewed in the closed or latched position. The teeth 564 are also separated by a space 572 that are illustrated as being generally the same dimension as space 568. In an alternative embodiment, the spaces 570 and 572 may be a different dimension from each other or from the corresponding opposite side master and slave latch plate spaces 566 and 568, respectively.

The teeth 558 of the master latch plate 534a are offset a distance $D_{offset}$ from the teeth 562 of the master latch plate 534b. In one embodiment, the offset dimension is approximately 5 mm. As illustrated, the offset dimension $D_{offset}$ is approximately one half of the general dimension of the space 566 and the adjacent tooth 558. However, the offset may be any dimensional amount desired. In one embodiment, the teeth 558, 560, 562 and 564 are generally the same dimension. Also, the spaces 566, 568, 570, and 572 are also the same dimension. In this embodiment, the offset dimension $D_{offset}$ provides an incremental locking adjustment of the movable rail 524 to the stationary rail 526. For example, the movable and stationary rails 524 and 526 may be adjusted in 5 mm increments by permitting the latch plates of one side or the other side to engage locking teeth of the rails. Thus, the ability to produce a finer adjustment increment with the use of large or coarse teeth is provided. The larger teeth are better able to handle stresses imparted by use or high impact conditions. Yet, the adjustment increments of the rails are similar to fine or thinner teeth.

The master and slave latch plates 534a and 534b, respectively, are illustrated as engaging the openings and complementary openings of the movable and stationary rails when moved from the released position to the locked position.

Referring now to FIGS. 28 and 29, there is illustrated an alternative embodiment of a release mechanism, indicated generally at 600. The release mechanism 600 is an externally actuated release mechanism that includes a toggle 602 that actuates a release plunger assembly, indicated generally at 604. The release plunger assembly 604 includes a piston 606 and a release shoe 608, which is illustrated as a generally U-shaped structure that contacts the latch plates. The toggle 602 may be actuated by a rod or cable (not shown) and contacts the top of the release plunger assembly 604. The plunger assembly 604 may be moved from a locked position, where a biasing spring 610 holds the shoe 608 away from the latch plates, to a release position, where the shoe 608 presses against the latch plates and moves the latch plate teeth out of engagement with aligned teeth of the movable and stationary rails.

The principle and mode of operation of this invention have been explained and illustrated in its preferred embodiments. However, it must be understood that this invention may be practiced otherwise than as specifically explained and illustrated without departing from its spirit or scope. Furthermore, elements of the various embodiments of the invention may be combined and arranged in any suitable manner to provide embodiments of the invention not specifically described or specifically illustrated.

What is claimed is:

1. A seat adjustment apparatus comprising:
a first rail having a first plurality of openings extending along a first side of the first rail along a longitudinal axis and a second plurality of openings extending along a second side of the first rail along the longitudinal axis, the first and second pluralities of openings being defined by spaced-apart locking surfaces of the first rail;
a second rail supported for movement relative to the first rail and having a first plurality of complementary openings extending along a first side of the second rail along the longitudinal axis and a second plurality of complementary openings extending along a second side of the second rail along the longitudinal axis, the first and second pluralities of complementary openings being defined by spaced-apart locking surfaces of the second rail; and
a locking mechanism having:
a first locking portion including a first latch plate and a second latch plate, the first and second latch plates being configured for rotation relative to each other, the first latch plate including a first plurality of teeth, the second latch plate including a second plurality of teeth, the first latch plate including a driving element that directly contacts a portion of the second latch plate and is configured to selectively move the second latch plate, and
a second locking portion including a third latch plate and a fourth latch plate, the third and fourth latch plates being configured for rotation relative to each other, the third latch plate including a third plurality of teeth, the fourth latch plate including a fourth plurality of teeth, and
the first and second locking portions being movable between a released position, wherein the second rail is freely movable relative to the first rail along the longitudinal axis, and a locked position, wherein at least one of the first, second, third, and fourth pluralities of teeth of the first, second, third, and fourth latch plates of the first and second locking portions extends into selected openings of the first and second pluralities of openings of the first rail and selected complementary openings of the first and second pluralities of complementary openings of the second rail such that the second rail is maintained in a selected position relative to the first rail.

2. The seat adjustment apparatus of claim 1, wherein the first locking portion is configured to move independently of the second locking portion between the released position and the locked position.

3. The seat adjustment apparatus of claim 2, wherein at least one of the first, second, third, and fourth pluralities of teeth of the first, second, third, and fourth latch plates of the first and second locking portions is engageable with selected locking surfaces of the spaced-apart locking surfaces of the first and second rails in the locked position.

4. The seat adjustment apparatus of claim 2, wherein the spaced-apart locking surfaces of the first and second rails are spaced-apart side surfaces of the first and second rails, and a relative axial movement between the first and second latch plates of the first locking portion is configured to permit the first plurality of teeth of the first latch plate that is in contact with the spaced-apart side surfaces of the first rail to contact, the spaced-apart side surfaces of the second rail, and the relative axial movement between the first and second latch plates of the first locking portion is further configured to permit the second plurality of teeth of the second latch plate that is in contact with the spaced-apart side surfaces of the first rail to contact, the spaced-apart side surfaces of the second rail to eliminate longitudinal free play between the first rail and the second rail.

5. The seat adjustment apparatus of claim 1, wherein the first and second latch plates are configured for relative axial movement along the longitudinal axis and the third and fourth latch plates are configured for relative axial movement along the longitudinal axis as the first and second locking portions are moved between the released position and the locked position such that at least one of the first and second locking portions is engageable with selected locking surfaces of the spaced-apart locking surfaces of the first and second rails to attenuate longitudinal free play between the first and second rails.

6. The seat adjustment apparatus of claim 1, wherein the first locking portion is configured to move independently of the second locking portion, and the first and second latch plates are configured for relative axial movement along the longitudinal axis and the third and fourth latch plates are configured for relative axial movement along the longitudinal axis as the first and second locking portions are moved between the released position and the locked position such that at least one of the first and second locking portions is engageable with selected locking surfaces of the spaced-apart locking surfaces of the first and second rails to attenuate longitudinal free play between the first and second rails, and when actuated between the released position and the locked position, the first latch plate is configured to rotationally drive the second latch plate and the third latch plate is configured to rotationally drive the fourth latch plate.

7. The seat adjustment apparatus of claim 6, wherein the third latch plate includes a driving element that directly contacts a portion of the fourth latch plate and is configured to selectively move the fourth latch plate.

8. The seat adjustment apparatus of claim 7, wherein at least one resilient member biases the first and third latch plates into engagement with the first and second pluralities of openings of the first rail and the first and second pluralities of complementary openings of the second rail.

9. The seat adjustment apparatus of claim 1, wherein the spaced-apart locking surfaces of the first rail are side surfaces of a plurality of teeth of the first rail, and each of the plurality of teeth of the first rail is tapered such that each of the plurality of teeth of the first rail includes a tip and a base wider than the tip.

10. The seat adjustment apparatus of claim 9, wherein as the first and second locking portions are moved from the released position to the locked position, at least one tooth of each of the first, second, third, and fourth pluralities of teeth of the first, second, third, and fourth latch plates of the first and second locking portions contacts a corresponding tooth of the plurality of teeth of the first rail, thereby causing axial movement of the first, second, third, and fourth latch plates of the first and second locking portions along the longitudinal axis.

11. The seat adjustment apparatus of claim 1, wherein the first and second locking portions are mounted on a hinge pin for pivotal movement, and one of the first and second rails has at least one integrally formed mounting tab configured to support the hinge pin.

12. The seat adjustment apparatus of claim 11, wherein the first, second, third, and fourth latch plates are configured for relative axial movement along the hinge pin.

13. A seat adjustment apparatus comprising:
a first rail having a first plurality of openings and a second plurality of openings;
a second rail supported for movement relative to the first rail and having a third plurality of openings and a fourth plurality of openings; and
a latch assembly including a first locking portion and a second locking portion, wherein:
the first locking portion includes a first latch plate having a first plurality of teeth and a second latch plate having a second plurality of teeth, the first latch plate and the second latch plate are configured for rotation relative to one another, and the first latch plate includes a driving element that directly contacts a portion of the second latch plate such that a rotational movement of the first latch plate causes a rotational movement of the second latch plate;
the second locking portion includes a third latch plate having a third plurality of teeth and a fourth latch plate having a fourth plurality of teeth, and the third latch plate and the fourth latch plate are configured for rotation relative to one another; and
the first locking portion and the second locking portion are movable between a released position, wherein none of the first, second, third, and fourth pluralities of the teeth of the first, second, third, and fourth latch plates of the first and second locking portions extend within the first and second pluralities of openings of the first rail to permit the second rail to move relative to the first rail, and a locked position, wherein at least one of the first, second, third, and fourth pluralities of teeth of the first, second, third, and fourth latch plates of the first and second locking portions extends within at least one of the first and second pluralities of openings of the first rail to prevent the second rail from moving relative to the first rail.

14. The seat adjustment apparatus defined in claim 13, wherein the driving element is a first driving element, and wherein the third latch plate includes a second driving element that directly contacts a portion of the fourth latch plate such that a rotational movement of the third latch plate causes a rotational movement of the fourth latch plate.

15. The seat adjustment apparatus defined in claim 14, wherein the second driving element is offset from a plane perpendicular to a plane of the third plurality of teeth.

16. The seat adjustment apparatus defined in claim 13, wherein the first latch plate and the second latch plate are configured for axial movement relative to one another.

17. The seat adjustment apparatus defined in claim 13, wherein the first latch plate and the second latch plate are configured for axial movement relative to one another, and wherein the third latch plate and the fourth latch plate are configured for axial movement relative to one another.

18. The seat adjustment apparatus defined in claim 13, wherein the first locking portion is configured to move independently of the second locking portion.

19. A vehicle seat assembly comprising:
a seat; and
a seat adjustment apparatus configured to support the seat on a portion of a vehicle, the seat adjustment apparatus including:

a first rail configured to be secured to the portion of the vehicle and having a first plurality of openings and a second plurality of openings;

a second rail secured to the seat and supported for movement relative to the first rail, the second rail having a third plurality of openings and a fourth plurality of openings; and a latch assembly including a first locking portion and a second locking portion, wherein:

the first locking portion includes a first latch plate having a first plurality of teeth and a second latch plate having a second plurality of teeth, the first latch plate and the second latch plate are configured for rotation relative to one another, and the first latch plate includes a driving element that directly contacts a portion of the second latch plate such that a rotational movement of the first latch plate causes a rotational movement of the second latch plate;

the second locking portion includes a third latch plate having a third plurality of teeth and a fourth latch plate having a fourth plurality of teeth, and the third latch plate and the fourth latch plate are configured for rotation relative to one another; and the first locking portion and the second locking portion are movable between a released position, wherein none of the first, second, third, and fourth pluralities of teeth of the first, second, third, and fourth latch plates of the first and second locking portions extend within the first and second pluralities of openings of the first rail to permit the second rail to move relative to the first rail, and a locked position, wherein at least one of the first, second, third, and fourth pluralities of teeth of the first, second, third, and fourth latch plates of the first and second locking portions extends within at least one of the first and second pluralities of openings of the first rail to prevent the second rail from moving relative to the first rail.

20. The vehicle seat assembly defined in claim 19, wherein the driving element is a first driving element, and wherein the third latch plate includes a second driving element that directly contacts a portion of the fourth latch plate such that a rotational movement of the third latch plate causes a rotational movement of the fourth latch plate.

* * * * *